(12) United States Patent
Rodenbeck et al.

(10) Patent No.: US 11,828,868 B2
(45) Date of Patent: Nov. 28, 2023

(54) COMPACT-POLARIMETRIC MONOPULSE APERTURE ANTENNA

(71) Applicant: The Government of the United States of America, as represented by the Secretary of the Navy, Arlington, VA (US)

(72) Inventors: Christopher T. Rodenbeck, Annandale, VA (US); Joshua B. Beun, Alexandria, VA (US); Thomas L. Ainsworth, Burke, VA (US); Philip Langlois, Belchertown, MA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 721 days.

(21) Appl. No.: 16/697,266

(22) Filed: Nov. 27, 2019

(65) Prior Publication Data

US 2021/0156953 A1 May 27, 2021

(51) Int. Cl.
*G01S 7/02* (2006.01)
*G01S 7/03* (2006.01)
(Continued)

(52) U.S. Cl.
CPC .............. *G01S 7/026* (2013.01); *G01S 7/032* (2013.01); *H01Q 1/125* (2013.01); *H01Q 1/27* (2013.01); *H01Q 15/02* (2013.01); *H01Q 15/14* (2013.01)

(58) Field of Classification Search
CPC ...... G01S 7/026; G01S 7/032; G01S 13/4409; H01Q 1/125; H01Q 1/27; H01Q 12/02; H01Q 15/14; H01Q 15/02
(Continued)

(56) References Cited

U.S. PATENT DOCUMENTS

| 484 A | * | 11/1837 | Holliday | .................. B02C 2/10 |
| | | | | 241/259 |
| 2,881,398 A | * | 4/1959 | Jones | ...................... H01P 1/161 |
| | | | | 333/24 R |

(Continued)

FOREIGN PATENT DOCUMENTS

WO WO-2014011087 A1 * 1/2014 ............. H01Q 13/02

OTHER PUBLICATIONS

F.J. Charbonneau et al., Compact Polarimetry Overview and Applications Assessment, Canadian Journal of Remote Sensing, 2010, pp. S298-S315, vol. 36, Suppl. 2, Taylor and Francis, Milton, Abingdon, Oxfordshire, UK.

(Continued)

*Primary Examiner* — Bernarr E Gregory
(74) *Attorney, Agent, or Firm* — US Naval Research Laboratory; Suresh Koshy

(57) ABSTRACT

An antenna apparatus includes an aperture antenna. The antenna apparatus also includes a compact polarimetric monopulse waveguide antenna feed configured to communicate with the aperture antenna. Optionally, the compact polarimetric monopulse waveguide antenna feed includes a monopulse antenna feed configured to communicate with the aperture antenna. The compact polarimetric monopulse waveguide antenna feed also includes a compact polarimetric monopulse feed network configured to communicate with the monopulse antenna feed.

17 Claims, 17 Drawing Sheets

(51) Int. Cl.
  *H01Q 1/12* (2006.01)
  *H01Q 1/27* (2006.01)
  *H01Q 15/02* (2006.01)
  *H01Q 15/14* (2006.01)
  *G01S 7/00* (2006.01)

(58) Field of Classification Search
  USPC .................................................... 342/188
  See application file for complete search history.

(56) References Cited

U.S. PATENT DOCUMENTS

| | | | | |
|---|---|---|---|---|
| 2,892,191 | A * | 6/1959 | Hogg | H01Q 21/245 343/756 |
| 3,540,045 | A * | 11/1970 | Taylor | G01S 13/44 342/149 |
| 3,742,506 | A * | 6/1973 | Wilkinson | H01Q 21/24 455/60 |
| 3,827,051 | A * | 7/1974 | Foldes | H04B 7/10 455/60 |
| 4,053,882 | A * | 10/1977 | Van Etten | G01S 7/025 342/194 |
| 4,329,687 | A * | 5/1982 | Kloevekorn | G01S 7/026 342/136 |
| 4,472,717 | A * | 9/1984 | Eaves | G01S 7/024 342/201 |
| 5,245,347 | A * | 9/1993 | Bonta | G01S 7/36 342/149 |
| 5,621,410 | A * | 4/1997 | Gray | G01S 7/024 342/188 |
| 6,028,562 | A * | 2/2000 | Guler | H01Q 21/005 343/770 |
| 8,089,415 | B1 * | 1/2012 | West | H01Q 5/55 343/777 |
| 8,345,716 | B1 * | 1/2013 | Ehret | H04B 7/10 455/562.1 |
| 2003/0222733 | A1 * | 12/2003 | Ergene | H01Q 25/02 333/125 |
| 2005/0225481 | A1 * | 10/2005 | Bonthron | H01Q 21/0093 342/175 |
| 2011/0285582 | A1 * | 11/2011 | Zhang | G01S 7/024 342/175 |
| 2013/0307719 | A1 * | 11/2013 | Granet | H01Q 3/08 342/153 |
| 2013/0321204 | A1 * | 12/2013 | Zahavi | H01Q 3/26 342/368 |
| 2015/0116154 | A1 * | 4/2015 | Artemenko | H01Q 19/17 342/374 |
| 2020/0119811 | A1 * | 4/2020 | Kay | H04B 10/118 |

OTHER PUBLICATIONS

J. Ma et al., Angle Estimation of Extended Targets in Main-Lobe Interference With Polarization Filtering, IEEE Transactions on Aerospace and Electronic Systems, Feb. 2017, pp. 169-189, vol. 53, No. 1, IEEE, Piscataway, NJ, USA.

J. Ma et al., Angle Estimation of Extended Targets With Polarization Filtering: A Single Snapshot Approacy, IEEE Transactions on Aerospace and Electronic Systems, Feb. 2018, pp. 257-268, vol. 54, No. 1, IEEE, Piscataway, NJ, USA.

P. Zheng et al., Design of a W-Band Full-Polarization Monopulse Cassegrain Antenna, IEEE Antennas and Wireless Propagation Letters, 2017, pp. 99-103, vol. 16, IEEE, IEEE, Piscataway, NJ, USA.

P.J.B. Clarricoats, et al., Multimode Corrugated Waveguide Feed for Monopulse Radar, IEE Proceedings, Apr. 1981, pp. 102-110, vol. 128, Pt. H, No. 2, Institution of Electrical Engineers, Piscataway, NJ, USA.

* cited by examiner

COMPACT-POLARIMETRIC MONOPULSE APERTURE ANTENNA

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing NC 108858-US2.

CROSS-REFERENCE TO RELATED APPLICATIONS

This Application claims the benefit of U.S. Provisional Application Ser. No. 62/772,680 filed on 29 Nov. 2018, the entirety of which is incorporated herein by reference.

BACKGROUND OF THE INVENTION

Field of the Invention

This invention relates in general to an antenna apparatus, and in particular to an antenna apparatus having a compact polarimetric architecture.

Description of the Related Art

Compact polarimetry is a radar technique that typically transmits circular polarization ("CP") and receives two orthogonal polarizations, typically vertical ("V") and horizontal ("H") linear polarization ("LP"). FIG. 1 stylistically illustrates three antenna apertures of a conventional compact polarimetric antenna 900: a CP transmitter 910, a V receiver 920, and an H receiver 930. Actual implementations often overlap the three apertures to save space. For example, the conventional compact polarimetric antenna 900 is implemented using, or collapsed into, a single aperture. Although other forms of polarimetry are possible, compact polarimetry requires only a single transmitter (hence the term "compact") and still provides polarimetric data on a target or scene of interest. An overview of polarimetric radar processing is discussed, for example, in F. J. CHARBONNEAU ET AL., "Compact polarimetry: Overview and applications assessment," Canadian J. Remote Sensing, 2010, pp. S298-S315, Vol. 36, No. 2, Taylor and Francis Group, Milton Park, Abingdon-on-Thames, Oxfordshire United Kingdom, which is incorporated hereto by reference.

Monopulse tracking is a radar technique that uses four closely spaced receiver antenna apertures to track the position of a target. An example of a conventional monopulse antenna 940 is shown in FIG. 2 and includes Apertures A 950, Aperture B 960, Aperture C 970, and Aperture D 980. Apertures A, B, C, and D receive radar return scattered from a distant target. The magnitude of the received signal from A+B−C−D is proportional to the target's bearing the vertical plane, while A+C−B−D is proportional to its bearing in the horizontal plane. Again, actual implementations often overlap these four apertures to save space. For example, the conventional monopulse antenna 940 is implemented using, or collapsed into, a single aperture. An overview of monopulse tracking is discussed, for example, in S. M. Sherman and D. K. Barton, Monopulse Principles and Techniques, Artech House, 2011.

J. MA ET AL., "Angle estimation of extended targets in main-lobe interference with polarization filtering," IEEE Trans. Aerospace Electronic Syst., February 2017, pp. 169-189, Vol. 53, No. 1, IEEE, Piscataway, NJ, USA, and J. MA ET AL., "Angle estimation with polarization filtering: A single snapshot approach," IEEE Trans. Aerospace Electronic Syst., February 2018, pp. 257-268, Vol. 54, No. 1, IEEE, Piscataway, NJ, USA, both incorporated herein by reference, discuss a "near-compact" polarimetric monopulse radar. Neither of these two articles provides a description of how such "near-compact" polarimetric monopulse radar is implemented or whether multiple antenna apertures are used; the articles merely provide mathematical background and radar signature data. J. MA ET AL.'s systems use linear rather than circular polarization on transmit, which is simpler, but has practical disadvantages, such as discussed in the F. J. CHARBONNEAU ET AL., article, compared with true compact polarimetry.

BRIEF SUMMARY OF THE INVENTION

An embodiment of the invention combines two radar sensing techniques in a single aperture antenna. The two sensing techniques are (1) compact polarimetry and (2) monopulse tracking. Realizing both capabilities in a single aperture makes possible a robust and cost effective sensor for tracking and characterizing targets of interest at long range.

An embodiment of the invention, for example, is used to track real world targets polarimetrically using a single antenna. In this case, the polarimetric monopulse antenna radiates from an airborne platform in the direction of a surface target. The tracking feature of the monopulse beams, combined with the distance measurement capability inherent to most radars, can be used to estimate the target's translational motion along the x-axis, the v-axis, and the z-axis as well as its rotational motion in roll, pitch, yaw. At MMW, small rotational motions of an extended target can result in rapid changes in the received polarization vector during the radar coherent processing interval; polarimetric monopulse information on receive can combat this "scintillation" effect by allowing the radar to track target features in polarization as well range and velocity, or to simply provide a stable output over time. The use of a circularly polarized transmitter ensures roughly equal scattering from most typical target features so that the return signals in the vertical and horizontal monopulse beams should fall within a similar receiver dynamic range.

An embodiment of the invention includes an antenna apparatus. The antenna apparatus includes an aperture antenna. The antenna apparatus also includes a compact polarimetric monopulse waveguide antenna feed configured to communicate with the aperture antenna. Optionally, the compact polarimetric monopulse waveguide antenna feed includes a monopulse antenna feed configured to communicate with the aperture antenna. The compact polarimetric monopulse waveguide antenna feed also includes a compact polarimetric monopulse feed network configured to communicate with the monopulse antenna feed.

DETAILED DESCRIPTION OF THE INVENTION

Applicant conceived of providing compact polarimetric monopulse in multiple apertures, such as by combining a circularly polarized transmitter is combined with multiple vertical and horizontal receivers capable of providing monopulse tracking in orthogonal planes. However, Applicant recognized that such multiple apertures are highly inefficient in their use of space. Accordingly, Applicant realized the provision of compact polarimetric monopulse by integrating all the polarizations into a common focal point to feed a single aperture antenna such as a reflector (i.e., "dish") antenna or lens. There are numerous standard configurations for reflector and lens aperture antennas. Examples of such standard reflector aperture antennas and lens aperture antennas are found in J. Volakis, *Antenna Engineering Handbook*, 4th ed., McGraw-Hill, 2007.

An embodiment of the invention includes an antenna apparatus 10, such as shown by way of example in FIGS. 3-6. The antenna apparatus 10 includes a standard aperture antenna 20. The antenna apparatus 10 also includes a compact polarimetric monopulse waveguide antenna feed 30 configured to communicate with the aperture antenna 20. For the purpose of this patent application, "compact polarimetric" is a term of art and is defined herein to characterize a polarimetric radar that has only one transmitter polarization, namely, a circular polarization.

Figure 1:
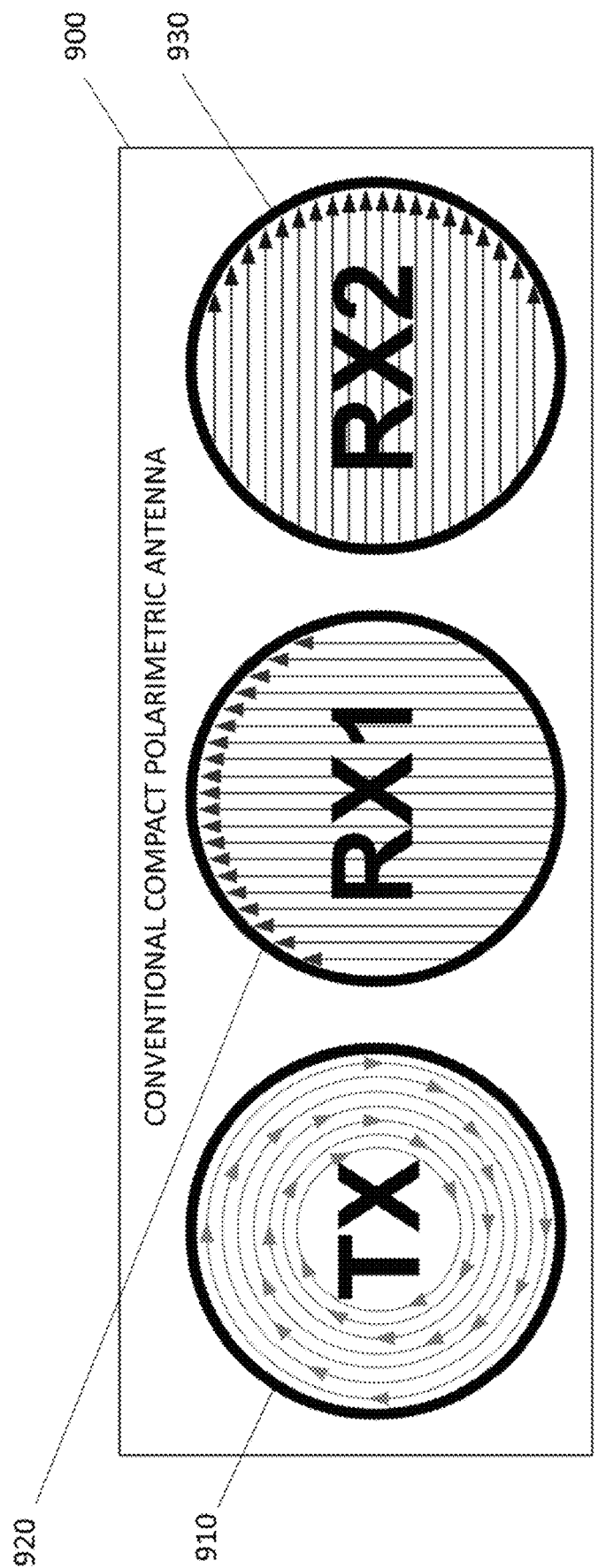
FIG. 1 is a block diagram of a prior art compact polarimetric antenna.
Figure 2:
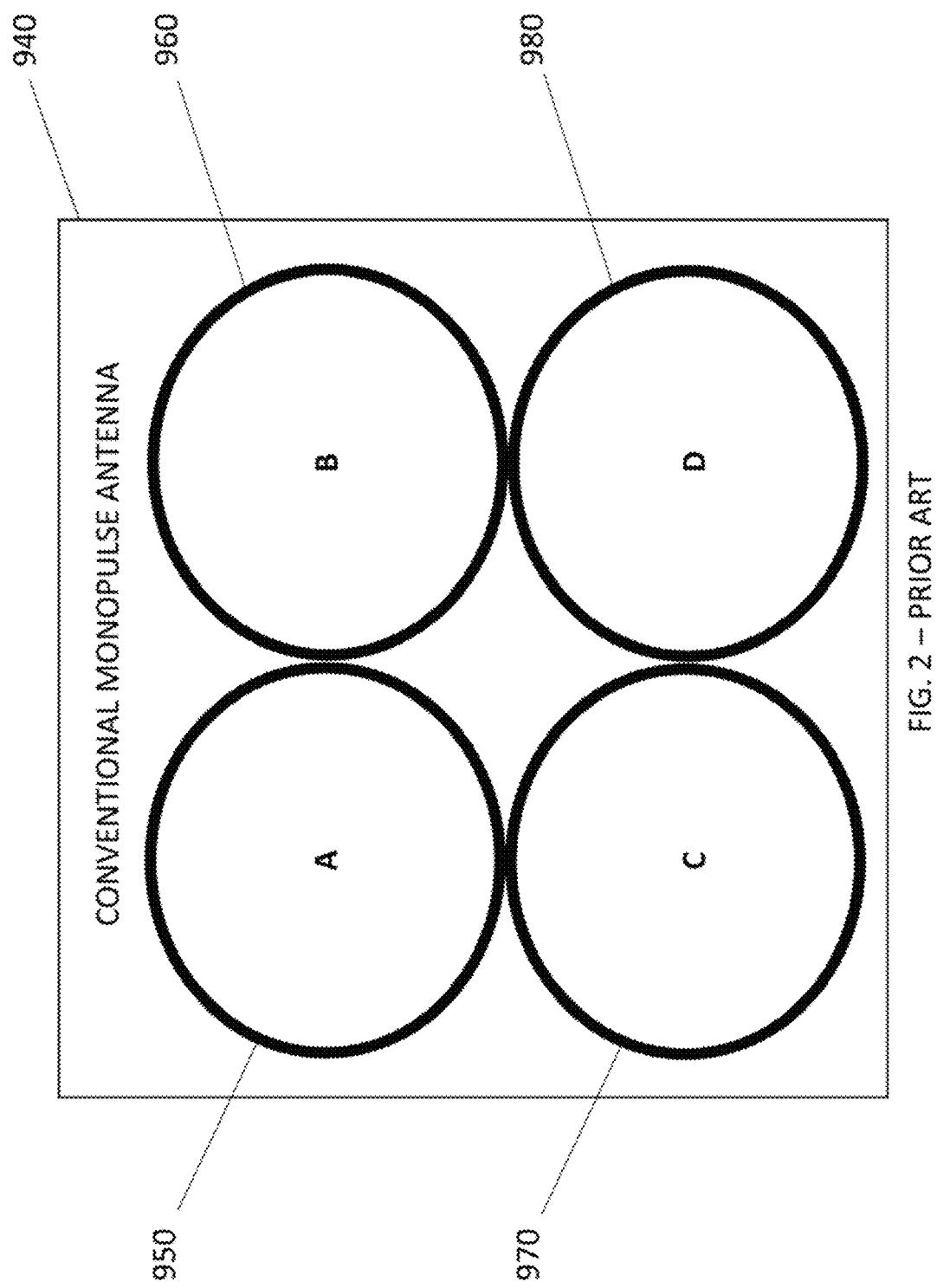
FIG. 2 is a block diagram of a prior art monopulse antenna.
Figure 3:
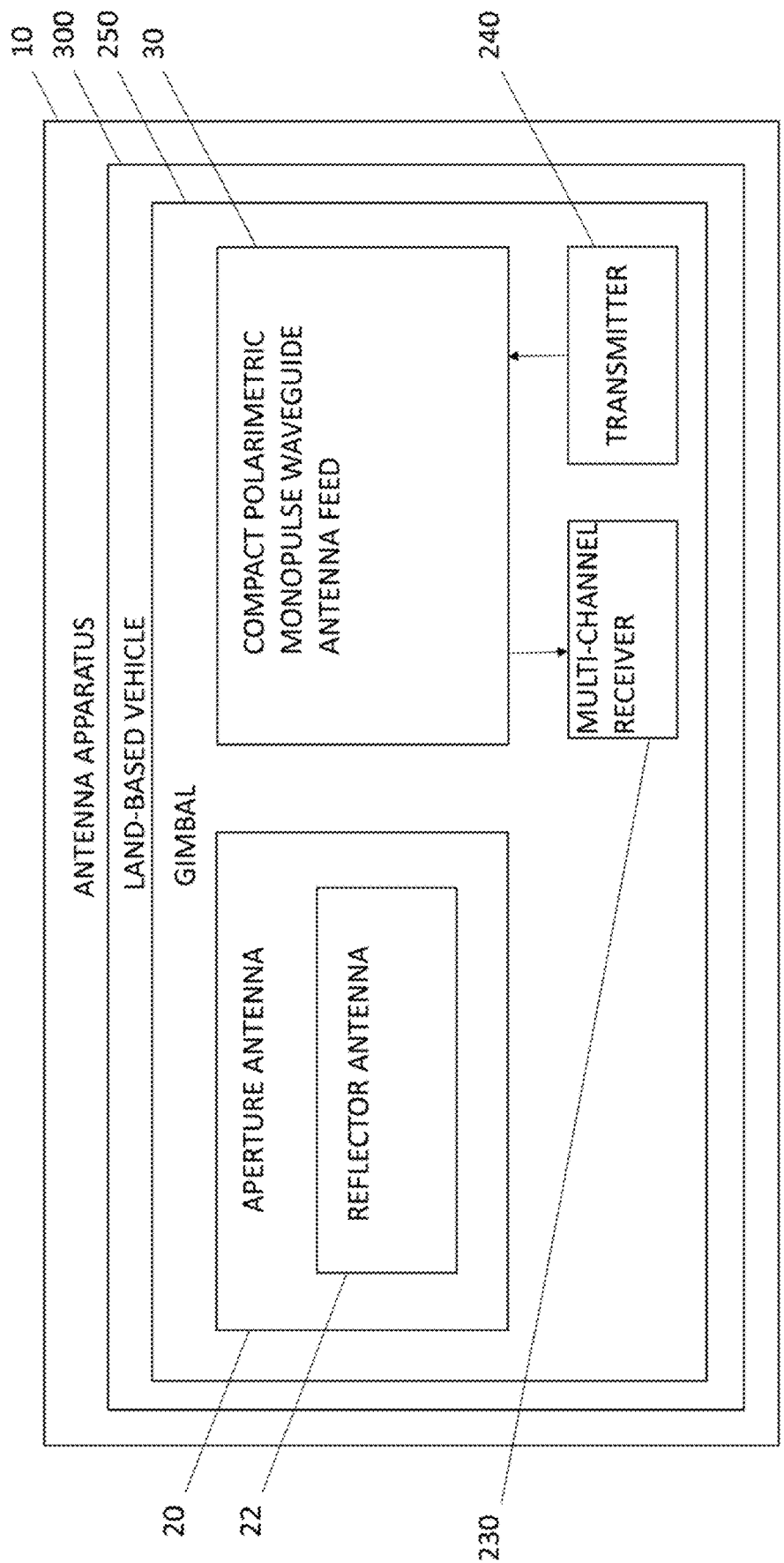
FIG. 3 is a block diagram of an antenna, apparatus according to an embodiment of the invention, which antenna apparatus includes a land-based vehicle.
Figure 4:
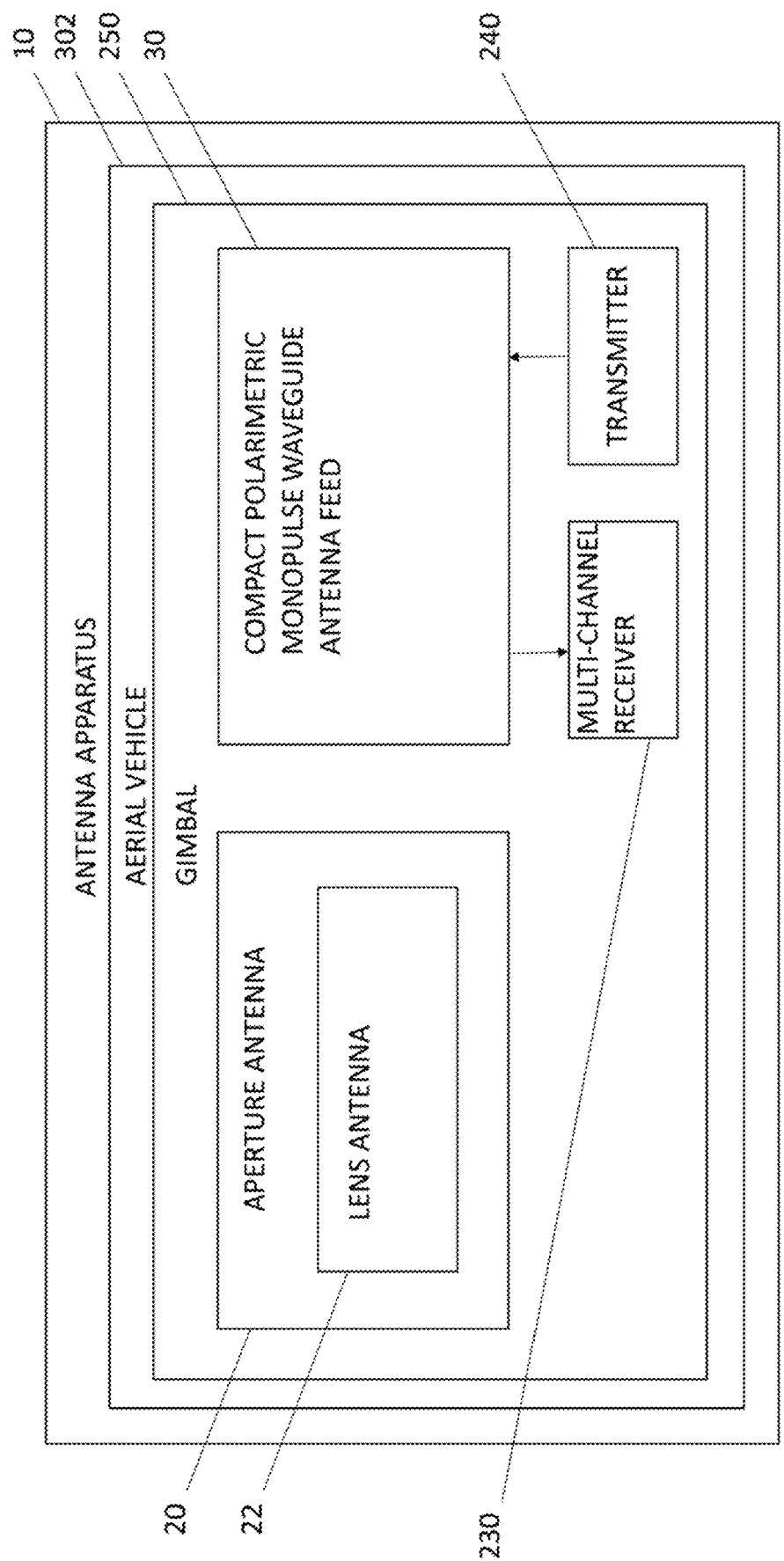
FIG. 4 is a block diagram of an antenna apparatus according to an embodiment of the invention, which antenna apparatus includes an aerial vehicle.
Figure 5:
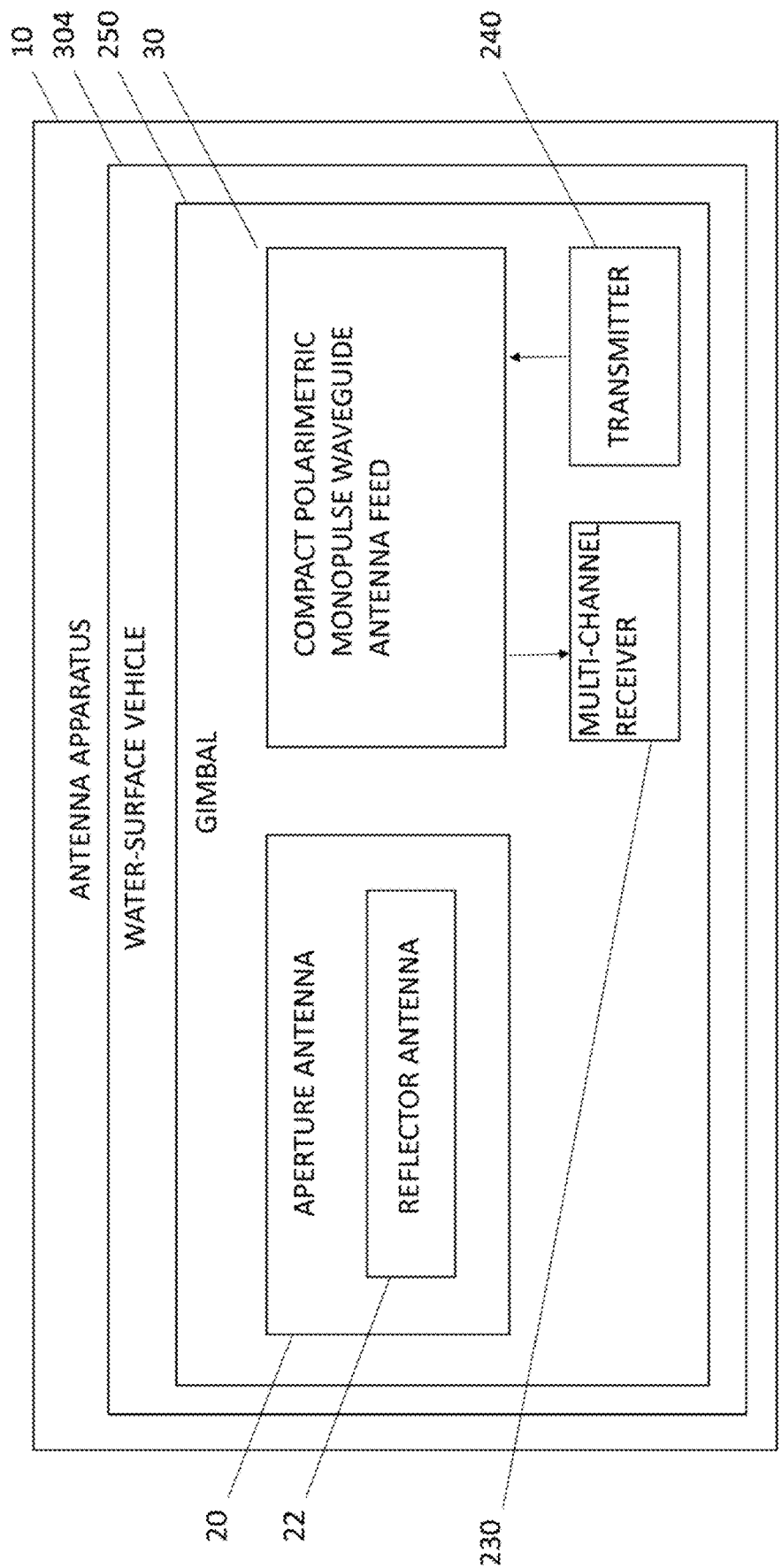
FIG. 5 is a block diagram of an antenna apparatus according to an embodiment of the invention, which antenna apparatus includes a water-surface vehicle.
Figure 6:
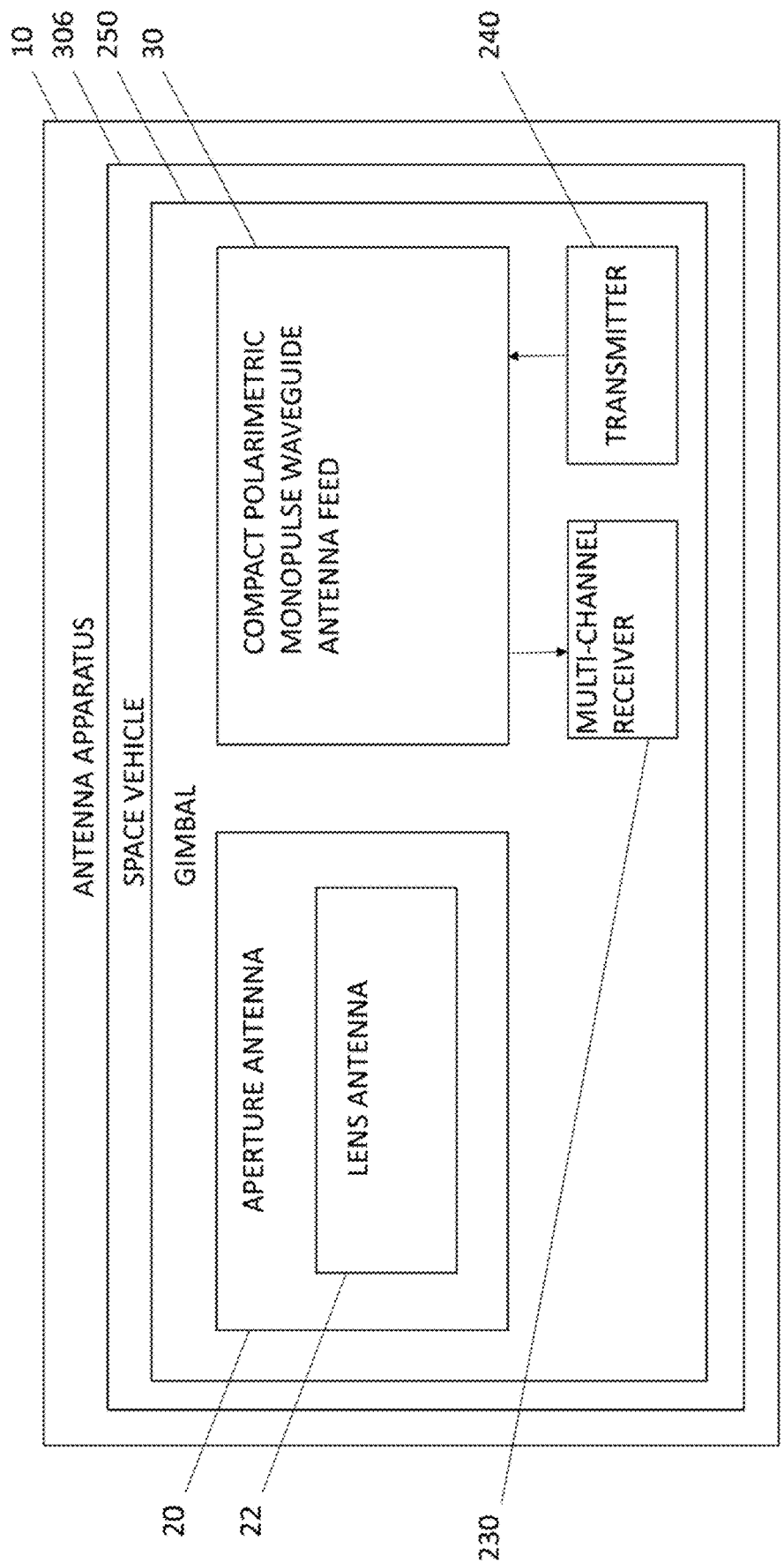
FIG. 6 is a block diagram of an antenna apparatus according to an embodiment of the invention, which antenna apparatus includes a space vehicle.
Figure 7:
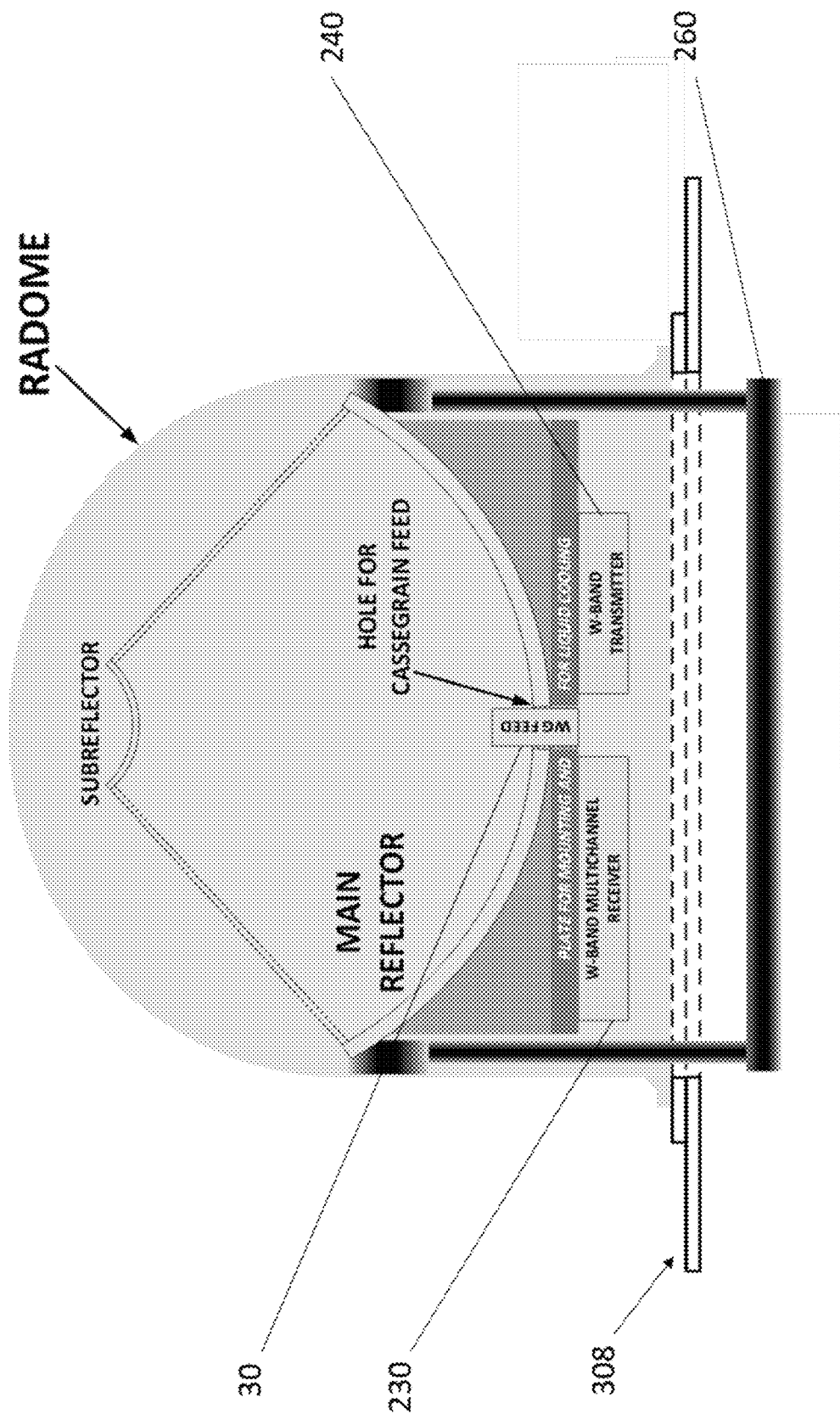
FIG. 7 is a sectional view of an antenna apparatus according to an embodiment of the invention, which antenna apparatus IS MOUNTED ON A POSITIONER AT A GROUND STATION.
Figure 8:
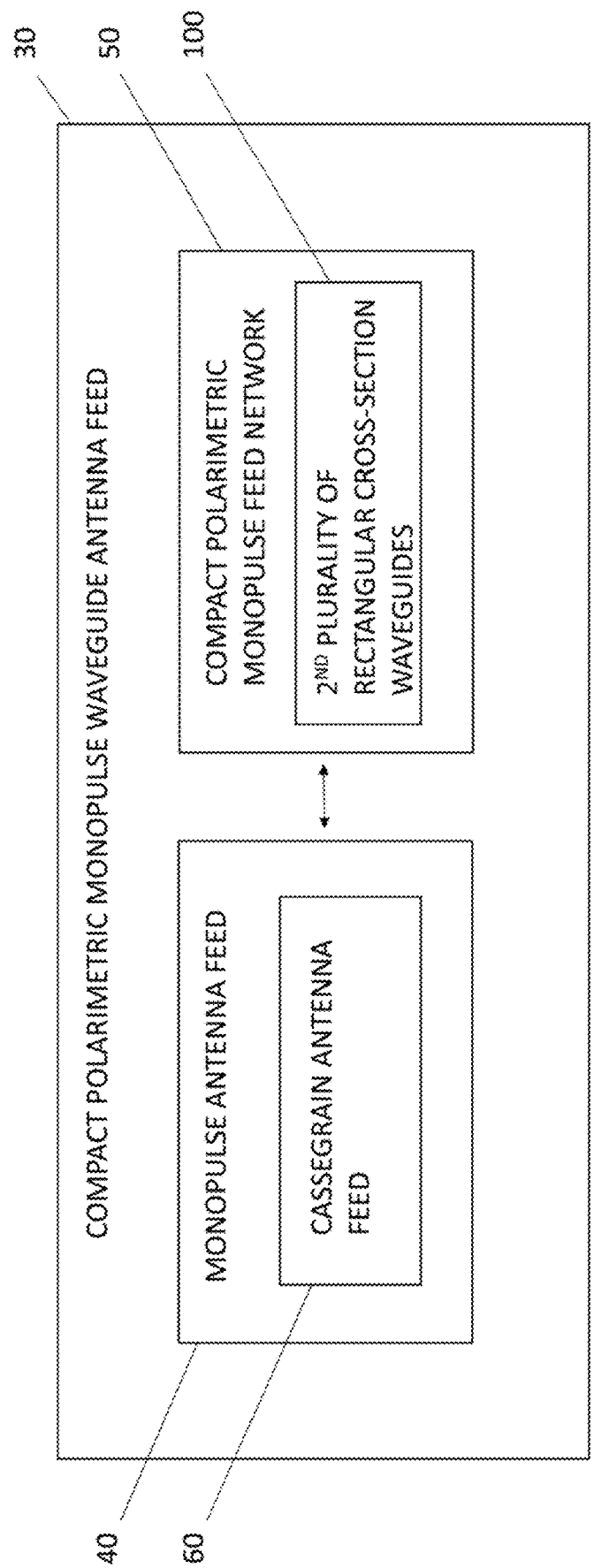
FIG. 8 is a block diagram of a compact polarimetric monopulse antenna feed according to an embodiment of the invention.
Figure 9:
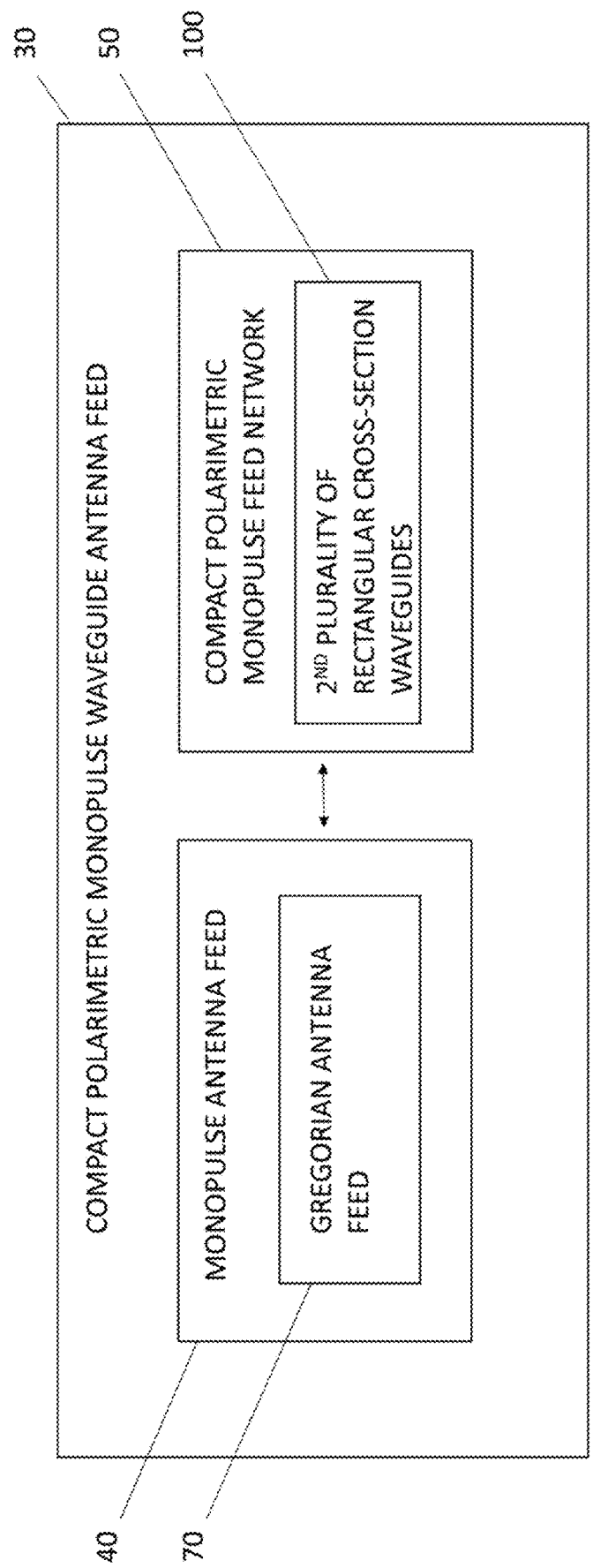
FIG. 9 is a block diagram of another compact polarimetric monopulse antenna feed according to an embodiment of the invention.
Figure 10:
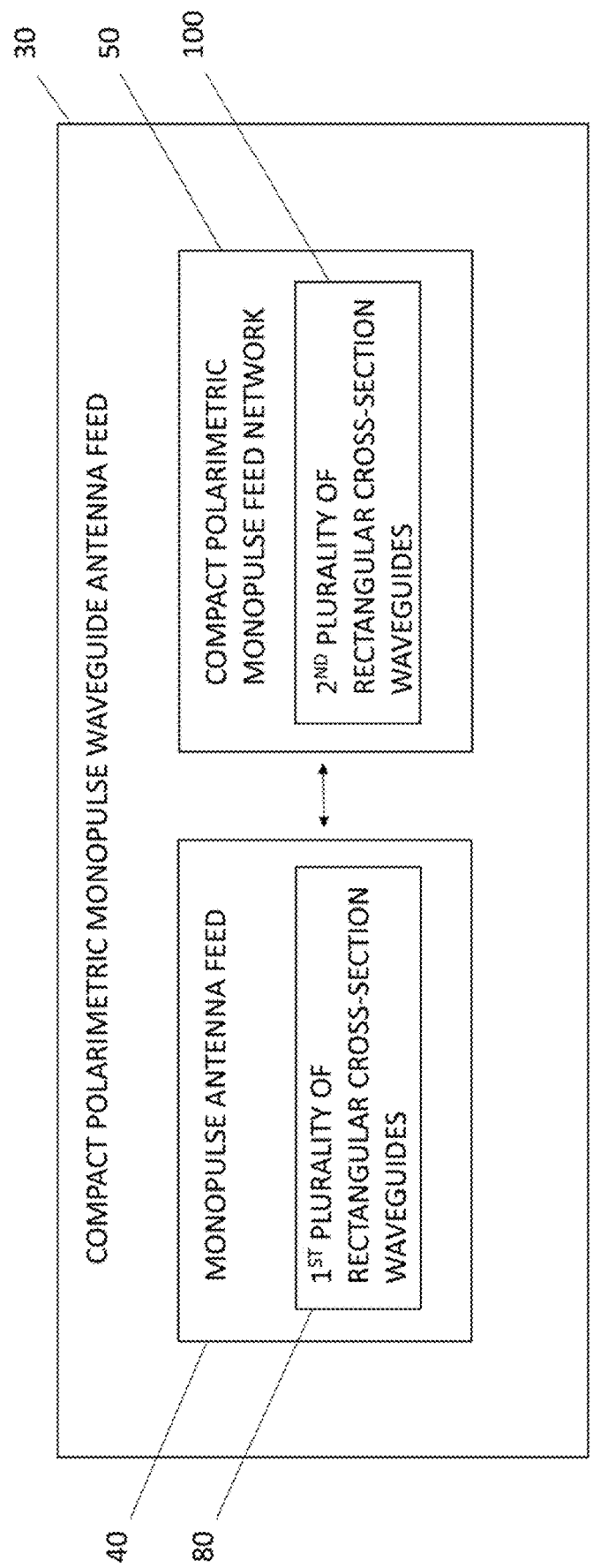
FIG. 10 is a block diagram of another compact polarimetric monopulse antenna feed according to an embodiment of the invention.
Figure 11:
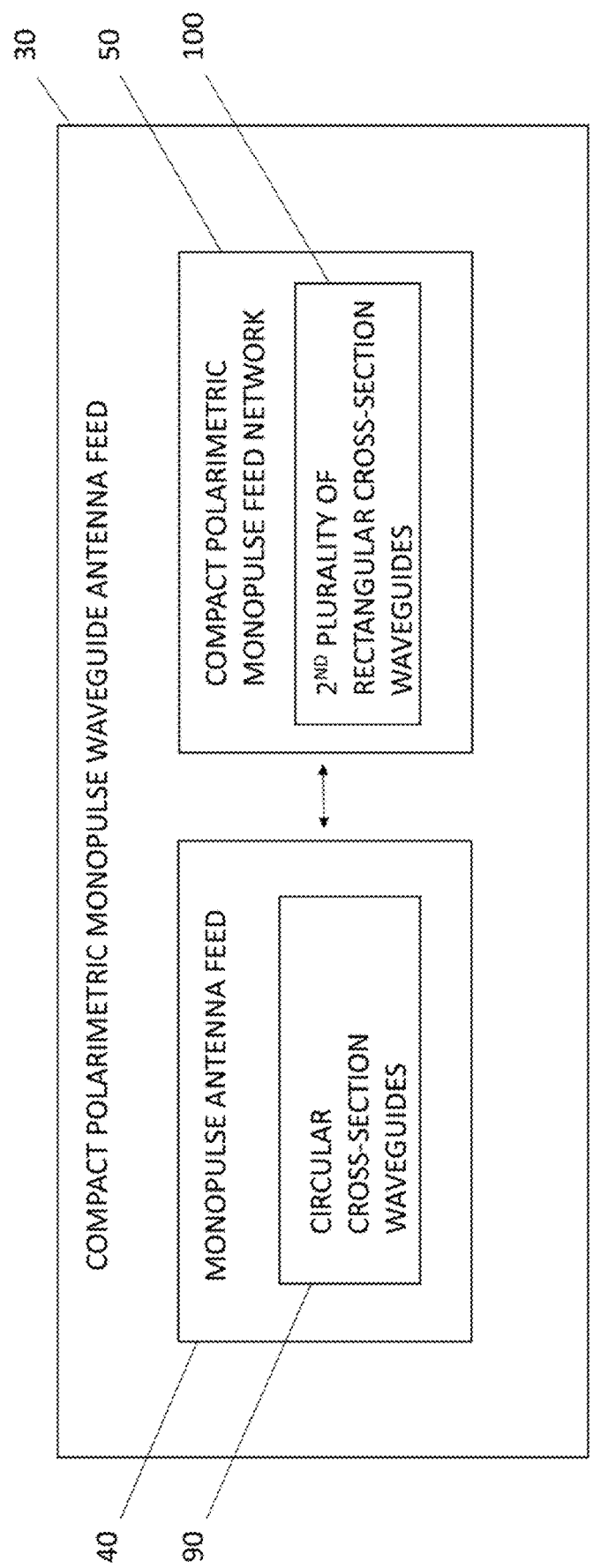
FIG. 11 is a block diagram of another compact polarimetric monopulse antenna feed according to an embodiment of the invention.

Optionally, the aperture antenna 20 includes a standard reflector antenna 22, such as shown by way of example in FIGS. 3, 5, and 7 or a standard lens antenna 24, such as shown by way of example in FIGS. 4 and 6.

Optionally, as shown by way of example in FIGS. 8-11, the compact polarimetric monopulse waveguide antenna feed 30 includes a monopulse antenna feed 40 configured to communicate with the aperture antenna 20. The compact polarimetric monopulse waveguide antenna feed 30 also includes a compact polarimetric monopulse feed network 50 configured to communicate with the monopulse antenna feed 40. For the purpose of this patent application, "compact polarimetric monopulse feed network" is, a term of art and is defined herein as a monopulse feed network that is circular polarized on transmitter as well as horizontally and vertically linearly polarized on receiver. Optionally, the monopulse antenna feed 40 comprises a standard Cassegrain antenna feed 60, such as shown by way of example in FIG. 8, or a standard Gregorian antenna feed 70, such as shown by way of example in FIG. 9. Optionally, the monopulse antenna feed 40 includes a first plurality of rectangular cross-section waveguides 80, such as shown by way of example in FIG. 10, or a plurality of circular cross-section waveguides 90, such as shown by way of example in FIG. 11. Optionally, the compact polarimetric monopulse feed network 50 includes a second plurality of rectangular cross-section waveguides 100, such as shown by way of example in FIGS. 10 and 11.

Figure 12:
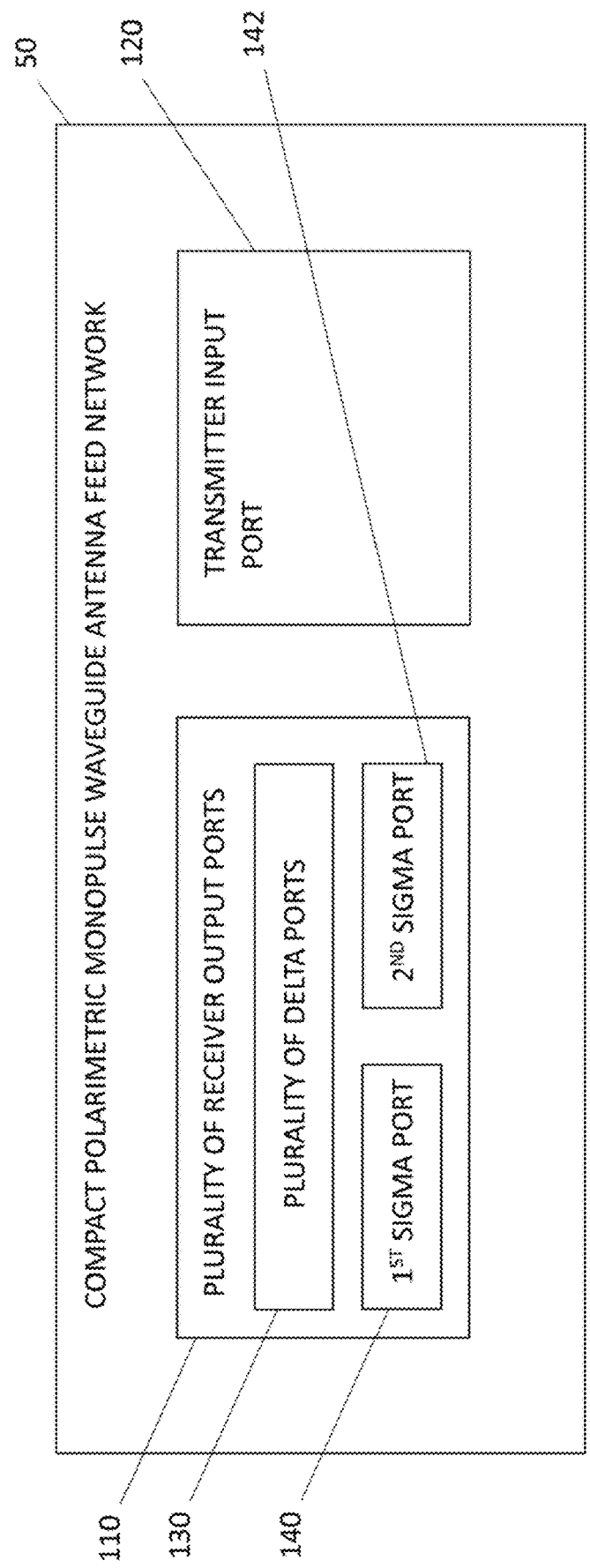
FIG. 12 is a block diagram of a compact polarimetric monopulse antenna feed network according to an embodiment of the invention.
Figure 13:
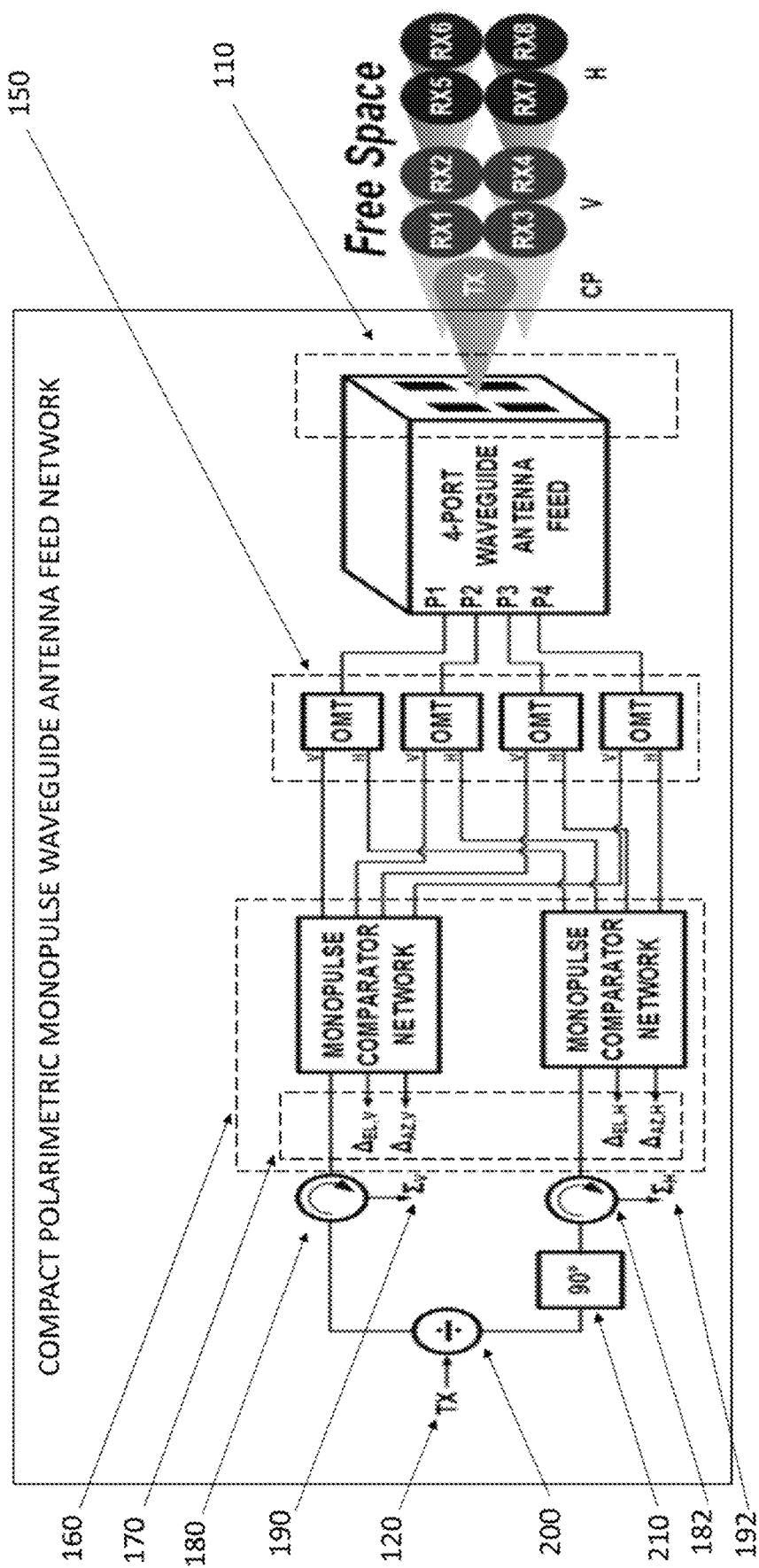
FIG. 13 is another block diagram of a compact polarimetric monopulse antenna feed network according to an embodiment of the invention.

Optionally, as shown by way of example in FIGS. 12-13, the compact polarimetric monopulse feed network 50 includes a plurality of receiver output ports 110 corresponding to a plurality of vertical receiver beams and a plurality of horizontal receiver beams, and also includes a transmitter input port 120 corresponding to a radar transmitter signal. The compact polarimetric monopulse feed network 50 generates a circular polarization transmitter beam by transforming the radar transmitter signal to circular polarization. Optionally, the plurality of receiver output ports 110 includes a plurality of delta ports 130 corresponding to monopulse differences in two orthogonal planes, the orthogonal planes being azimuthal and elevation planes. The plurality of receiver output ports 110 also includes a plurality of sigma ports 140 142 corresponding to monopulse sums in two orthogonal polarizations, the two orthogonal polarizations being vertical and horizontal polarizations.

Optionally, as shown by way of example in FIG. 13, the compact polarimetric monopulse feed network 50 includes a plurality of standard orthomode transducers 150 configured to communicate with the monopulse antenna feed 40. The compact polarimetric monopulse feed network 50 also includes a plurality of standard monopulse comparator networks 160 configured to communicate with the plurality of orthomode transducers 140. The plurality of monopulse comparator networks 160 includes the plurality of delta ports 170. The compact polarimetric monopulse feed network 50 also includes a plurality of standard duplexing devices 180, 182 configured to communicate respectively with the plurality of monopulse comparator networks 160. The plurality of duplexing devices 180, 182 includes the plurality of sigma ports 190, 192. The compact polarimetric monopulse feed network 50 also includes a standard power divider 200 configured to communicate directly or indirectly with the plurality of duplexing devices 180, 182. The compact polarimetric monopulse feed network 50 also includes a standard phase shifter 210 configured to communicate with the power divider 200 and a respective duplexing device 182 of the plurality of duplexing devices 180, 182.

Figure 14:
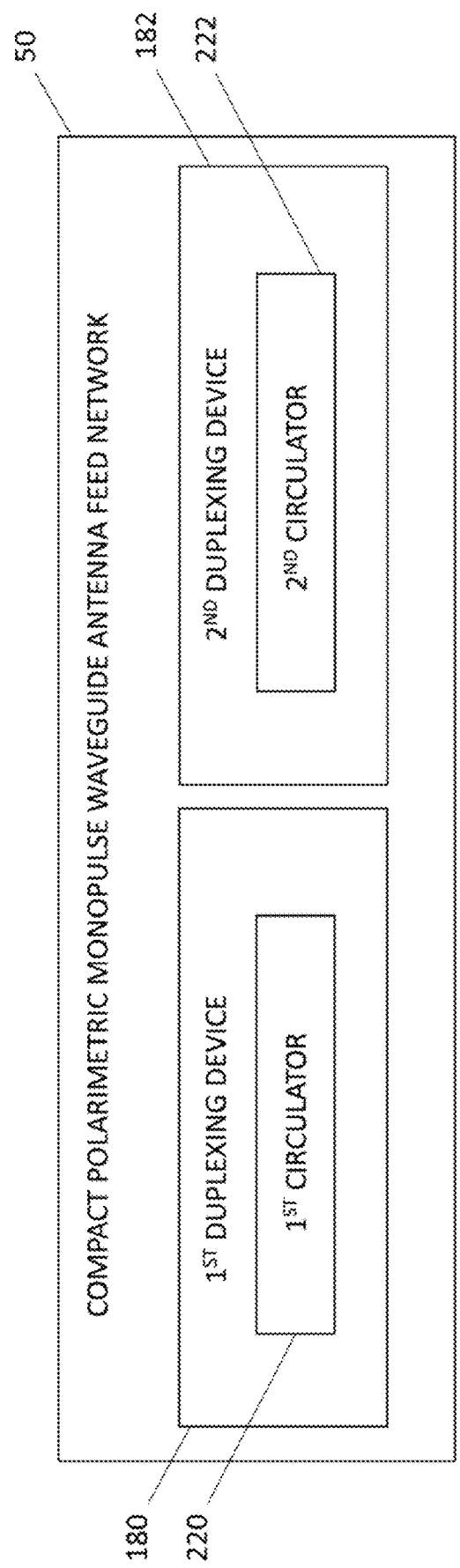
FIG. 14 is a block diagram of duplexing devices according to an embodiment of the invention.
Figure 15:
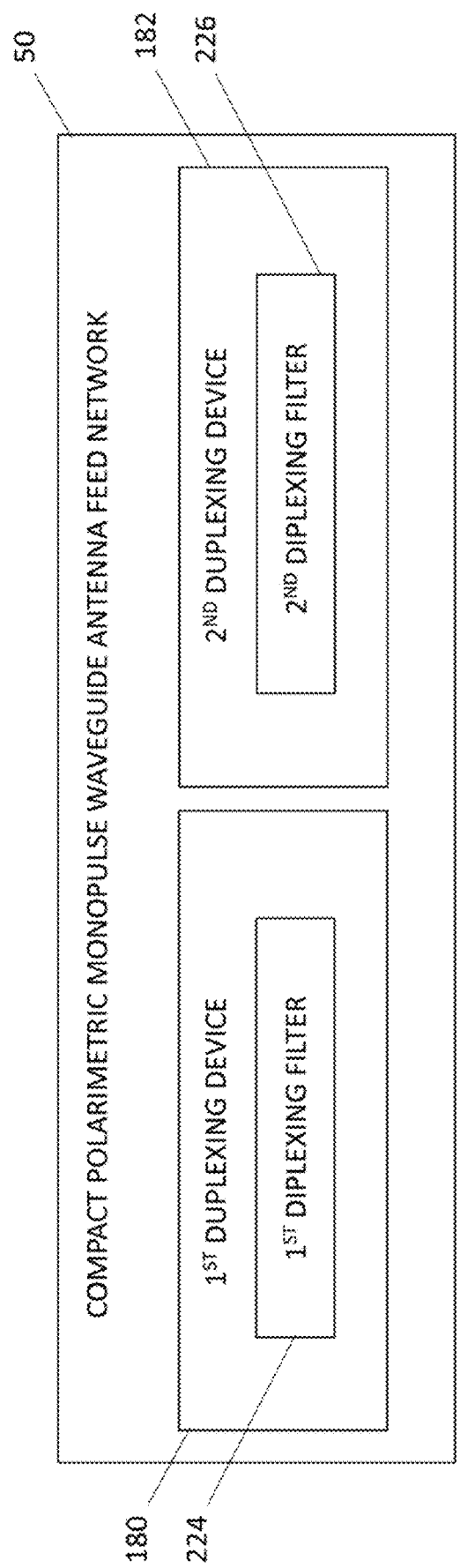
FIG. 15 is another block diagram of duplexing devices according to an embodiment of the invention.
Figure 16:
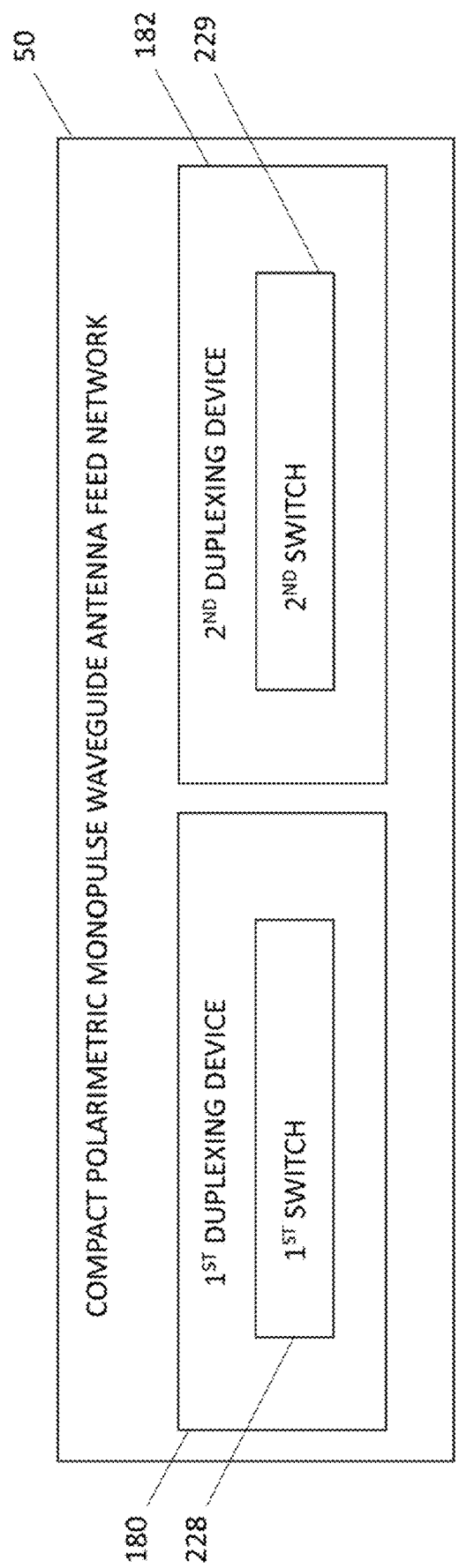
FIG. 16 is another block diagram of duplexing devices according to an embodiment of the invention.

Optionally, the plurality of duplexing devices 180, 182 includes a plurality of standard circulators 220, 222, such as shown by way of example in FIG. 14, a plurality of standard diplexing filters 224, 226, such as shown by way of example in FIG. 15, or a plurality of standard switches 228, 229, such as shown by way of example in FIG. 16.

Optionally, as shown by way of example in FIGS. 3-4 and 7, the antenna apparatus 10 further includes a standard multi-channel receiver 230 configured to communicate with the polarimetric monopulse waveguide antenna feed 30. Also, as shown by way of example in FIGS. 3-4 and 7, the antenna apparatus 10 further includes a standard transmitter 240 configured to communicate with the polarimetric monopulse waveguide antenna feed 30. The compact polarimetric monopulse feed network is circular polarized on the transmitter 240, and the compact polarimetric monopulse feed network is horizontally and vertically linearly polarized on the receiver 230.

Optionally, as shown by way of example in FIGS. 3-7, the antenna apparatus 10 further includes a standard gimbal 250 or a standard positioner 260. For example, the positioner 260 includes a standard pedestal. The aperture antenna 20 and the compact polarimetric monopulse waveguide antenna feed 30 are mounted on the gimbal 250 or the positioner 260. Optionally, the antenna apparatus 10 further includes a standard vehicle. The standard vehicle includes the gimbal 250. The vehicle includes a standard land-based vehicle 300, such as shown by way of example in FIG. 3, a standard aerial vehicle 302, such as shown by way of example in FIG. 4, a standard water-surface vehicle 304, such as shown by way of example in FIG. 5, and/or a standard space vehicle 306, such as shown by way of example in FIG. 6.

Another embodiment of the invention is shown by way of example in FIG. 7 for W-band airborne radar. A gimbaled Cassegrain antenna including a standard main reflector and a standard subreflector is mounted inside a standard radome. A standard W band transmitter and a standard receiver are mounted on a standard liquid cold plate attached to the back of the main reflector. A compact polarimetric monopulse antenna feed 30 connects the transmitter and the receiver to the antenna allowing the transmitter and all the receiver channels to share the same antenna aperture. Optionally, the antenna apparatus 10 further includes a standard ground station 308. For example, the aperture antenna 20 and the compact polarimetric monopulse waveguide antenna feed 30 is mounted on a standard positioner 260 at the ground station.

Figure 17:
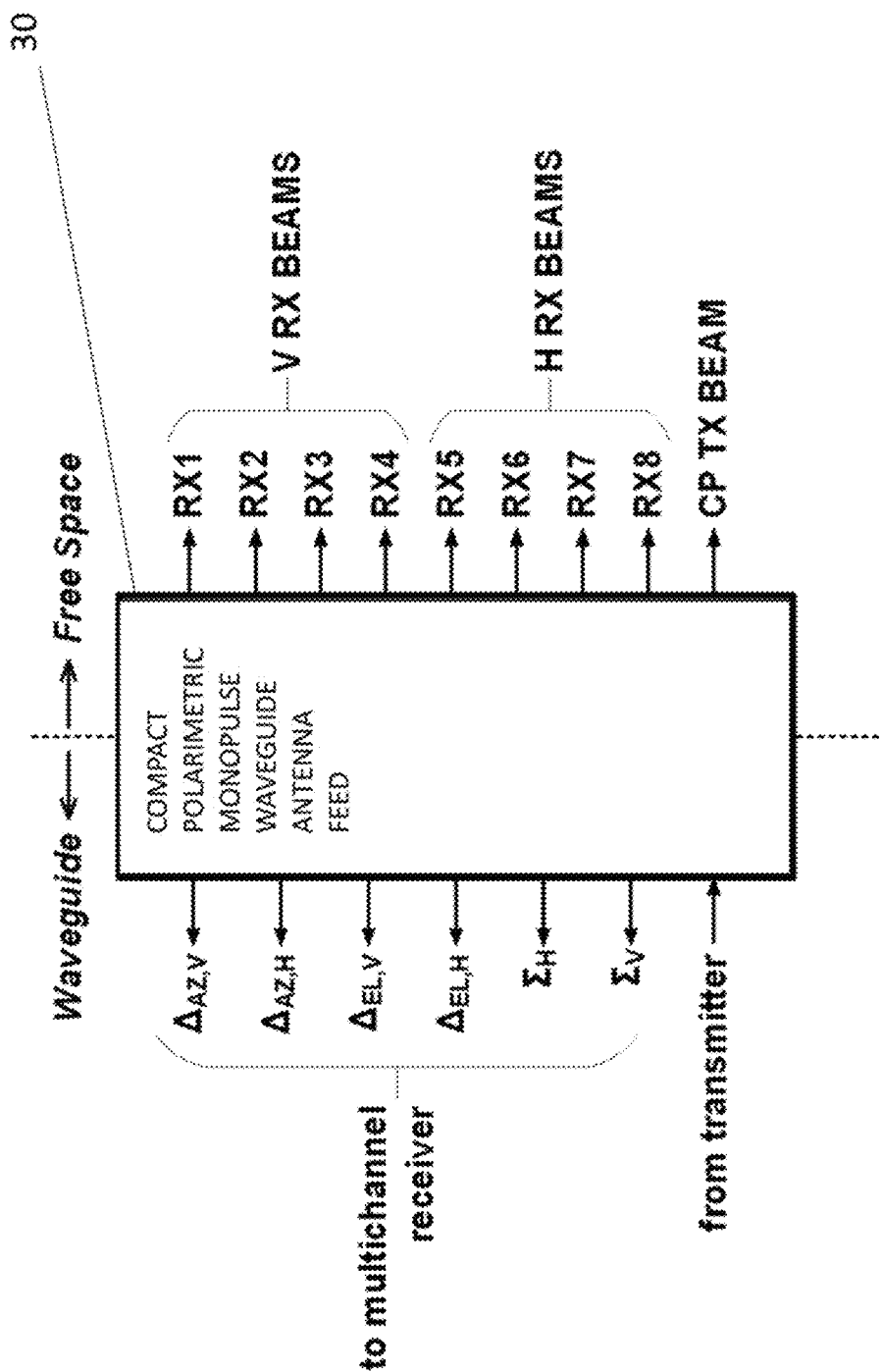
FIG. 17 is a block diagram for the compact polarimetric monopulse antenna feed according to an embodiment of the invention.

A block diagram for the compact polarimetric monopulse antenna feed 30 according to an embodiment of the invention is shown in FIG. 17. The antenna feed 30 translates the input/output ports of the transmitter and multichannel receiver into free space beams illuminating a common antenna aperture. On the waveguide side, there are six receiver ports ($\Delta_{AZ,V}$, $\Delta_{AZ,H}$, $\Delta_{EL,V}$, $\Delta_{EL,H}$, $\Sigma_H$, $\Sigma_V$), such as conventionally used in monopulse direction finding and one transmitter port. The $\Delta$ ports correspond to monopulse differences in two orthogonal planes (i.e., azimuth and elevation) and two orthogonal polarizations (i.e.. vertical and horizontal). The $\Sigma$ ports correspond to sum of the receiver monopulse patterns in in two orthogonal polarizations (i.e., vertical and horizontal). The transmitter input corresponds to the radar signal that is transformed to circular polarization by the waveguide feed. On the free space side, receiver ("RX") 1-4 generate the four vertical ("V") beams, RX 5-8 generate four horizontal ("H") beams, and the transmitter ("TX") port generates a circularly polarized ("CP") beam. These nine beams illuminate a common aperture that focuses them to increase directivity.

An embodiment of the invention includes a compact polarimetric monopulse antenna feed 30 that generates one circularly polarized transmitter ("CP TX") beam, four vertical receiver ("V RX") beams, and four horizontal receiver ("H RX") beams. In this case, the TX beam is multiplexed with the $\Sigma_H$ and $\Sigma_V$ beams so that only four ports are needed on the waveguide feed. A 90° phase shift in the TX path is used to generate the circular polarization. This arrangement allows the feed and aperture illumination to be more efficient at the expense of the TX power loss through the circulators.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

This written description sets forth the best mode of the invention and provides examples to describe the invention and to, enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. An apparatus comprising:
    an aperture antenna configured to simultaneously transmit in circular polarization and receive in linear polarization; and a compact polarimetric monopulse waveguide antenna feed configured to communicate with said aperture antenna.

2. The apparatus according to claim 1, wherein said aperture antenna comprises one of an reflector antenna and a lens antenna.

3. The apparatus according to claim 1, wherein said compact polarimetric monopulse waveguide antenna feed comprises:
   a monopulse antenna feed configured to communicate with said aperture antenna; and
   a compact polarimetric monopulse feed network configured to communicate with said monopulse antenna feed.

4. The apparatus according to claim 3, wherein said monopulse antenna feed comprises one of a Cassegrain antenna feed and a Gregorian antenna feed.

5. The apparatus according to claim 3, wherein said monopulse antenna feed comprises one of a first plurality of rectangular cross-section waveguides and a plurality of circular cross-section waveguides.

6. The apparatus according to claim 3, wherein said compact polarimetric monopulse feed network comprises a second plurality of rectangular cross-section waveguides.

7. The apparatus according to claim 3, wherein said compact polarimetric monopulse feed network comprises:
   a plurality of receiver output ports corresponding to a plurality of vertical receiver beams and a plurality of horizontal receiver beams; and
   a transmitter input port corresponding to a radar transmitter signal, said compact polarimetric monopulse feed network generating a circular polarization transmitter beam by transforming the radar transmitter signal to circular polarization.

8. The apparatus according to claim 7, wherein said plurality of receiver output ports comprises:
   a plurality of delta ports corresponding to monopulse differences in two orthogonal planes, the orthogonal planes being azimuthal and elevation planes; and
   a plurality of sigma ports corresponding to monopulse sums in two orthogonal polarizations, the two orthogonal polarizations being vertical and horizontal polarizations.

9. The apparatus according to claim 8, wherein said compact polarimetric monopulse feed network comprises:
   a plurality of orthomode transducers configured to communicate with said monopulse antenna feed;
   a plurality of monopulse comparator networks configured to communicate with said plurality of orthomode transducers, said plurality of monopulse comparator networks comprising said plurality of delta ports;
   a plurality of duplexing devices configured to communicate respectively with said plurality of monopulse comparator networks, said plurality of duplexing devices comprising said plurality of sigma ports;
   a power divider configured to communicate one of directly and indirectly with said plurality of duplexing devices;
   a phase shifter configured to communicate with said power divider and a respective duplexing device of said plurality of duplexing devices.

10. The apparatus according to claim 8, wherein said plurality of duplexing devices comprises one of a plurality of circulators, a plurality of diplexing filters, and a plurality of switches.

11. The apparatus according to claim 10, further comprising:
   a vehicle comprising said gimbal, said vehicle being at least one of a land-based vehicle, a water-surface vehicle, an aerial vehicle, and a space vehicle.

12. The apparatus according to claim 1, further comprising:
   a multi-channel receiver configured to communicate with said polarimetric monopulse waveguide antenna feed; and
   a transmitter configured to communicate with said polarimetric monopulse waveguide antenna feed,
   wherein said compact polarimetric monopulse feed network is circular polarized on said transmitter and said compact polarimetric monopulse feed network is horizontally and vertically linearly polarized on said receiver.

13. The apparatus according to claim 1, further comprising:
   a gimbal,
   wherein said aperture antenna and said compact polarimetric monopulse waveguide antenna feed are mounted on said gimbal.

14. The apparatus according to claim 1, further comprising:
   a positioner,
   wherein said aperture antenna and said compact polarimetric monopulse waveguide antenna feed are mounted on said positioner.

15. The apparatus according to claim 14, further comprising:
   a ground station comprising said positioner.

16. An apparatus comprising:
   an aperture antenna;
   a compact polarimetric monopulse waveguide antenna feed configured to communicate with said aperture antenna;
   a multi-channel receiver configured to communicate with said polarimetric monopulse waveguide antenna feed; and
   a transmitter configured to communicate with said polarimetric monopulse waveguide antenna feed,
   wherein said compact polarimetric monopulse feed network is circular polarized on said transmitter and said compact polarimetric monopulse feed network is horizontally and vertically linearly polarized on said receiver such that aperture antenna is configured to simultaneously transmit in circular polarization and receive in linear polarization.

17. An apparatus comprising:
   an aperture antenna; and
   a compact polarimetric monopulse waveguide antenna feed configured to communicate with said aperture antenna,
wherein said compact polarimetric monopulse waveguide antenna feed comprises:
   a monopulse antenna feed configured to communicate with said aperture antenna; and
   a compact polarimetric monopulse feed network configured to communicate with said monopulse antenna feed,
wherein said compact polarimetric monopulse feed network comprises:
   a plurality of receiver output ports corresponding to a plurality of vertical receiver beams and a plurality of horizontal receiver beams; and
   a transmitter input port corresponding to a radar transmitter signal, said compact polarimetric monopulse feed network generating a circular polarization transmitter beam by transforming the radar transmitter signal to circular polarization, wherein said plurality of receiver output ports comprises:
   a plurality of delta ports corresponding to monopulse differences in two orthogonal planes, the orthogonal planes being azimuthal and elevation planes; and
   a plurality of sigma ports corresponding to monopulse sums in two orthogonal polarizations, the two orthogonal polarizations being vertical and horizontal polarizations, wherein said compact polarimetric monopulse feed network comprises:
   a plurality of orthomode transducers configured to communicate with said monopulse antenna feed;
   a plurality of monopulse comparator networks configured to communicate with said plurality of orthomode transducers, said plurality of monopulse comparator networks comprising said plurality of delta ports;
   a plurality of duplexing devices configured to communicate respectively with said plurality of monopulse comparator networks, said plurality of duplexing devices comprising said plurality of sigma ports;
   a power divider configured to communicate one of directly and indirectly with said plurality of duplexing devices;
   a phase shifter configured to communicate with said power divider and a respective duplexing device of said plurality of duplexing devices.

\* \* \* \* \*